United States Patent [19]

Yamada et al.

[11] 4,163,282

[45] Jul. 31, 1979

[54] ELECTRICAL CONTROL METHOD AND APPARATUS FOR COMBUSTION ENGINES

[75] Inventors: Takashi Yamada, Anjo; Shinji Shirasaki, Kariya; Yukio Sakakibara, Anjo; Hiroyasu Fukaya, Nagoya, all of Japan

[73] Assignee: Nippondenso Co., Ltd., Kariya, Japan

[21] Appl. No.: 834,042

[22] Filed: Sep. 16, 1977

[30] Foreign Application Priority Data

Sep. 24, 1976 [JP] Japan ................................ 51-115227

[51] Int. Cl.[2] ......................... G06F 7/70; F02D 21/04

[52] U.S. Cl. ................................ 364/431; 123/32 EB; 123/117 D; 364/104

[58] Field of Search ................................ 364/431, 442; 123/32 EB, 117 D

[56] References Cited

U.S. PATENT DOCUMENTS

| | | | |
|---|---|---|---|
| 3,835,819 | 9/1974 | Anderson, Jr. ...................... | 364/442 |
| 3,916,170 | 10/1975 | Norimatsu et al. .................. | 364/442 |
| 3,969,614 | 7/1976 | Moyer et al. ........................ | 364/431 |
| 4,009,699 | 3/1977 | Hetzler et al. ....................... | 364/431 |

*Primary Examiner*—Felix D. Gruber

*Attorney, Agent, or Firm*—Berman, Aisenberg & Platt

[57] ABSTRACT

In a method and apparatus for controlling a combustion engine, a digital computer repetitively and sequentially calculates first and second values corresponding to the proper settings or actuation of first and second control devices that are used to control the combustion of the air-fuel mixture, by sensing changes in the operating conditions of the engine, the computer being programmed to calculate such first and second values from a first fuction describing a desired relationship between the condition of the engine and the setting of the first control device and from a second function describing another desired relationship between the condition of the engine and the setting of the second control device. An interrupt controller is provided to receive pulses which are synchronized with the rotational speed of the engine (hereinafter: synchronized pulse or pulses) and at least one clock pulse in a predetermined time interval so as to initially calculate the first value in the computer upon receiving a synchronized pulse even during the calculation of the second value, and subsequently calculate the second value after completion of the calculation of the first value.

20 Claims, 5 Drawing Figures

ELECTRICAL CONTROL METHOD AND APPARATUS FOR COMBUSTION ENGINES

BACKGROUND OF THE INVENTION

The present invention relates to an electrical control method and apparatus for a combustion engine, and more particularly to an improvement in a method and apparatus for controlling the combustion of the air-fuel mixture in an internal combustion engine in which a digital computer is employed to control the amount of air-fuel mixture metered into the combustion chamber of the engine, the spark-ignition timing of the air-fuel mixture, the recirculation of exhaust gases into the combustion chamber, and the like, in accordance with changes in the operating conditions of the engine.

In a conventional method and apparatus for controlling the combustion of the air-fuel mixture in an engine of this kind, such as for instance, disclosed in U.S. Pat. No. 3,969,614 by David F. Moyer et al. issued on July 13, 1976, a digital computer is employed to calculate values corresponding to proper settings of the various control devices used to control the energy conversion functions of the engine. The digital computer is programmed to repetitively calculate the various values or settings mathematically from an algebraic function or functions describing desired relationships between various settings of the control devices and the sensed condition of the engine. This means that the calculations of the various values are simultaneously executed on a real-time basis at short angular intervals of rotation of the engine output shaft. As a result, the digital computer is required to have a large calculation capacity so as to complete the calculations of the various values at a high speed. Thus, such a conventional engine control apparatus and its digital computer are inevitably complicated in their construction and high in production cost.

SUMMARY OF THE INVENTION

It is, therefore, a primary object of the present invention to provide an improved control method and apparatus for a combustion engine in which a digital computer initially calculates a first value corresponding to proper settings of first control means used to control the amount of air-fuel mixture metered into the internal combustion engine, spark-ignition timing, and the like, at angular intervals of rotation of the engine output shaft, and subsequently calculates a second value corresponding to proper settings of second control means used to control exhaust gas recirculation in the internal combustion engine, and the like, after completion of the calculation of the first value, to thereby reduce the production cost of the digital computer.

Accordingly, in the practice of the present invention, there is provided a method for controlling a combustion engine having an output shaft driven by mechanical energy converted from heat energy caused by the combustion an air-fuel mixture, the engine including first and second control means for controlling the combustion of the air-fuel mixture in accordance with changes in a condition of the engine, the method comprising the steps of:

generating an electrical signal in the form of a binary number, the signal indicating the condition of the engine as of a selected instant in time during operation of the engine;

generating a pulse train synchronized with the rotational speed of the output shaft;

generating at least one clock pulse in a predetermined time interval;

calculating first and second values corresponding to respective settings of the first and second control means in a time sequence by a computer programmed to calculate the first and second values from a first function describing a desired relationship between the condition of the engine and the setting of the first control means and from a second function describing another desired relationship between the condition of the engine and the setting of the second control means, the calculations of the first and second values being respectively performed using the binary number electrical signal in accordance with one of said synchronized pulses and the clock pulse such that the calculation of the first value is initially conducted in response to the synchronized pulse during the calculation of the second value and the remaining calculation of the second value is subsequently conducted after completion of the calculation of the first value;

converting the first and second calculated values into the setting of the first and second control means; and thereafter continuously repeating the above sequence of steps for controlling the combustion of the air-fuel mixture in response to changes in the binary number electrical signal.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
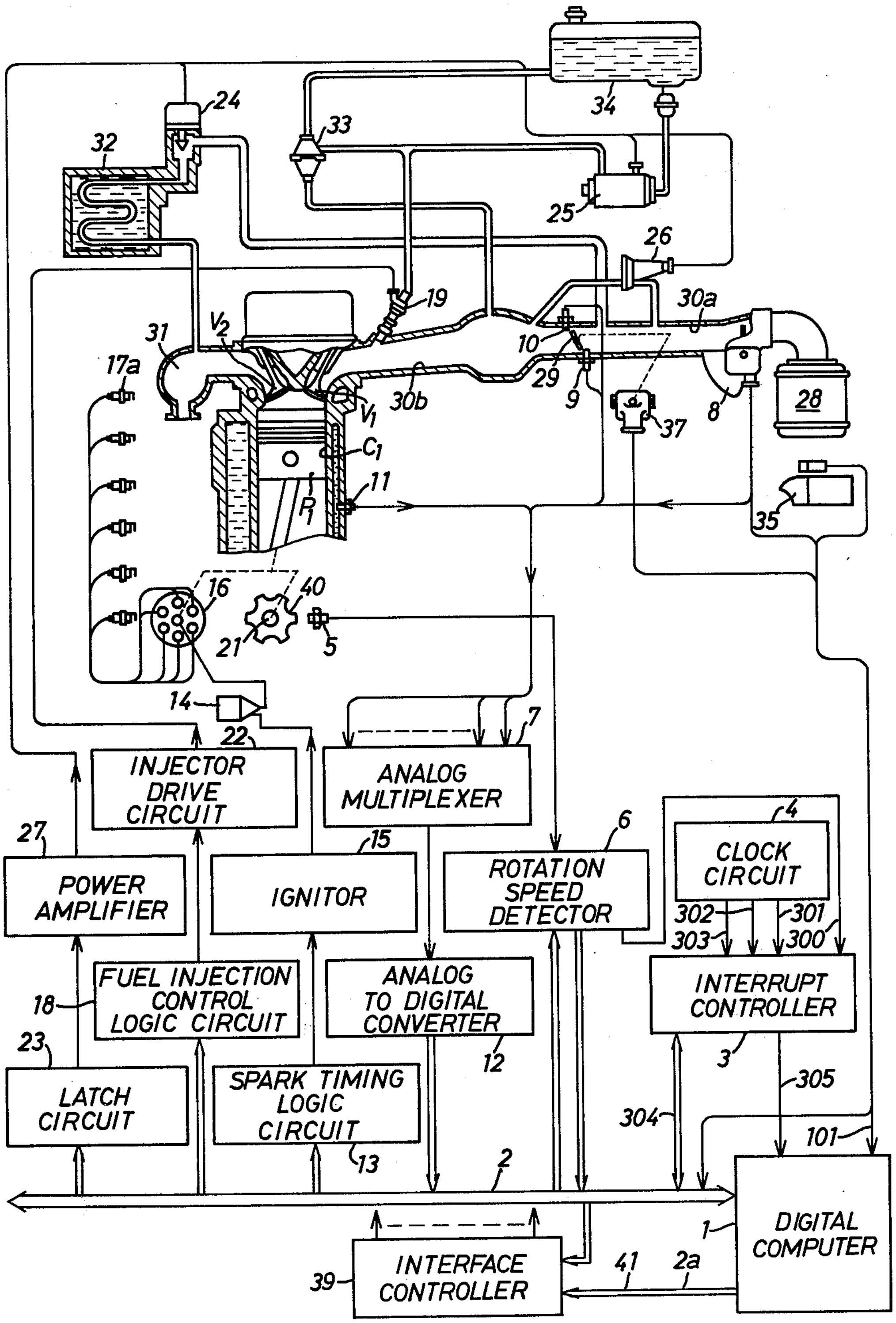
FIG. 1 is a schematic block diagram of an electrical control system for an internal combustion engine in accordance with the present invention.

Referring now to the accompanying drawings, in particular to FIG. 1, there is illustrated a schematic block diagram of an electrical control system for an internal combustion engine according to the present invention, in which settings of ignition timing, fuel injection and exhaust gas recirculation are controlled by a digital computer in a time sharing method in response to various conditions of the engine sensed during its operation, thereby to maximize energy conversion efficiency, fuel economy and torque and to minimize the emission from the engine of noxious pollutants. In the internal combustion engine, upon opening of an intake valve $V_1$, the air flowing through an air cleaner 28, an induction passage **30*a* and an intake manifold 30*b* is mixed with fuel injected from an electrically controlled fuel injector 19 and, in turn, the air-fuel mixture is introduced into a combustion chamber of the engine. The air-fuel mixture is compressed by a piston $P_1$ in an upward stroke within a cylinder $C_1$ and is ignited by a spark produced by a spark plug 17***a* in the combustion chamber to rotate a crank shaft or output shaft 21 connected to the piston $P_1$. Upon opening of an exhaust valve $V_2$, the exhaust gases are discharged into an exhaust manifold 31 and partially recirculated into the induction passage 30*a* by way of a water cooler 32 and an exhaust gas recirculation or EGR valve 24. The fuel from the fuel injector 19 is delivered from a fuel pump 25 connected to a fuel tank 34 and is controlled in pressure by a fuel pressure regulator 33. An air valve 26 is arranged to associate with the fuel injector 19 to supply the air from upstream to downstream of a throttle valve 29 when the throttle valve 29 is closed. The spark plug 17*a* receives high voltage electric energy from a distributor 16 connected to an ignition coil 14 at appropriate time intervals. Although the engine shows only one combustion chamber formed by the cylinder $C_1$ and the piston $P_1$, it should be understood that the engine control system is designed for use on a six-cylinder engine, including a total of six cylinders, six intake valves, six exhaust valves and six pistons, six spark plugs and six fuel injectors. Further, it should be recognized that in a case of the reciprocating engine, the spark plugs 17*a* and the fuel injectors 19 are activated at least once per two rotations of the crank shaft 21, while the EGR valve 24 is opened occasionally. In the case of a rotary engine, the spark plugs and the fuel injectors are activated at least once for each rotation of the rotor, while the EGR valve is also opened occasionally.

The engine control system comprises a digital computer 1 having a microprocessor and a memory and for calculating repetitively first and second values corresponding to respective optimum settings or timing of actuation of the ignition coil 14, the fuel injectors 19 and the EGR valve 24 to control the combustion of the air-fuel mixture in accordance with various conditions of the engine. The computer 1 is programmed to mathematically calculate the above-mentioned values from a first algebraic function describing a desired relationship between the conditions of the engine and the operation or actuation of the ignition coil 14 and the fuel injectors 19 and from a second algebraic function describing another desired relationship between the conditions of the engine and the setting of the EGR valve 24. The desired algebraic relationships are determined experimentally. At every instant during the operation of the engine, and over its entire range of operation, there exist optimum settings and conditions of operation for the above-mentioned devices. The definition of what is optimum is not fixed, but rather depends upon the use to which the engine is to be put and its state of operation at a particular instant. The calculations in the computer 1 are performed in a time sharing method in response to a signal from an interrupt controller 3, as described later in detail. The interrupt controller 3 is controlled by instruction words from the computer 1 in such a manner that the priority of the calculations is determined in accordance with respective signals applied to the computer 1 from a rotation speed detector 6 and a clock circuit 4.

The rotation speed detector 6 includes a magnetic pick up transducer 5 to produce angular pulses in response to the rotational speed of the crank shaft 21. The transducer 5 preferably comprises an electrical coil which generates an alternating voltage across its terminals as a result of changes in magnetic flux in its magnetic circuit. These flux changes are produced by a notched member 40 connected to the crank shaft 21 for rotation therewith. The notched member 40, for example, has six notches equally spaced to generate three angular pulses during one rotation of the crank shaft 21. Each pulse generated from the transducer 5 is divided by a third in frequency in the rotation speed detector 6. The pulses from the transducer 5 in the form of a binary number are transferred to a bidirectional data bus 2 for the computer 1 through the rotation speed detector 6. The clock circuit 4 is designed to produce first, second and third clock pulses at the time intervals of 100 msec, 1 sec and 10 sec from timing pulses issued from the computer 1.

Various sensors which are used to detect the conditions of the engine will now be described in detail. An analog multiplexer 7 receives electric signals from an air flow meter 8, a first vacuum sensor 9, a second vacuum sensor 10 and a coolant temperature sensor 11. The various input signals are selected in the multiplexer 7 in accordance with requests from the computer 1 and are converted, one-by-one, by an analog-to-digital converter 12 into digital form. The converted digital signals are transferred to the computer 1 by way of the data bus 2. The air flow meter 8 is provided in the induction passage 30*a* to detect the amount of air flow from the air cleaner 28 and temperature of the air. The first vacuum sensor 9 is disposed within the induction passage 30*a* slightly upstream of the throttle valve 29, while the second vacuum sensor 10 is also disposed within the induction passage 30*a* slightly down stream of the throttle valve 29. The vacuum sensors 9 and 10 detect negative pressures on the upstream and downstream sides of the throttle valve 29, respectively. The coolant temperature sensor 11 is provided in the engine cooling system to sense the coolant temperature of the engine. The computer 1 directly receives signals that are responsive to the activation and deactivation of the air flow meter 8 and the starter motor 35 of the vehicle, and simultaneously receives first and second signals from a throttle position sensor 37 which are generated in the throttle position sensor 37 to detect the occurrence of the idle position and the 50°-open angular position of the throttle valve 29.

A spark timing logic circuit 13 is connected to the computer 1 by way of the data bus 2 to preset therein digital values transferred from the computer 1. The logic circuit 13 is also triggered by angular pulses from the transducer 5 to generate ignition timing control pulses whose width and phase are varied in accordance with the preset digital values in the logic circuit 13 to control energization of the ignition coil 14. The output signals from the logic circuit 13 are amplified by an ignitor 15 and are then applied to the ignition coil 14.

A fuel injection control logic circuit 18 is connected to the computer 1 by way of the data bus 2 to receive digital values transferred from the computer 1 so as to periodically generate a control pulse for each rotation of the crank shaft 21. The pulse width of the control pulses are varied in proportion to the digital values received from the computer and the pulses are then amplified by an injector drive circuit 22. Thus, the on-off timing of the fuel injectors 19 are controlled by the amplified control pulses from the drive circuit 22.

A latch circuit 23 is also connected to the computer 1 by way of the data bus 2 to receive digital values transferred from the computer 1. The latch circuit 23 generates and latches control pulses in accordance with the digital values and applies them to a power amplifier 27 in response to signals transferred from the computer 1. The latched control pulses are then amplified by a power amplifier 27 and are then applied to the EGR valve 24, the fuel pump 25 and the air valve 26 so that the on-off timing of these devices are controlled in accordance with the values calculated in the computer 1.

An interface controller 39 is provided to control operation of an interface circuit, including the rotation speed detector 6, the analog multiplexer 7, the analog-to-digital converter 12, the spark timing logic circuit 13, the fuel injection control logic circuit 18 and the latch circuit 23, in accordance with calculations of the algebraic functions in the computer 1. The operation of the interface controller 39 is controlled by a control signal and the calculated values transferred from the computer 1 through a control bus *2a* and the data bus 2.

In the practice of the present invention, an RCA CDP1801D COSMAC MICROPROCESSOR, as reported in a USER MANUAL for the CDP1801D COSMAC MICROPROCESSOR published by RCA, is preferred for use as the microprocessor of the computer 1, and a programmable read-only memory (PROM) and a random access memory (RAM) have been used as the memory of the computer 1. In the following description, the particular programming process will be understood from the "MPM-102 Program Development Guide" for the COSMAC MICROPROCESSOR.

Figure 2:
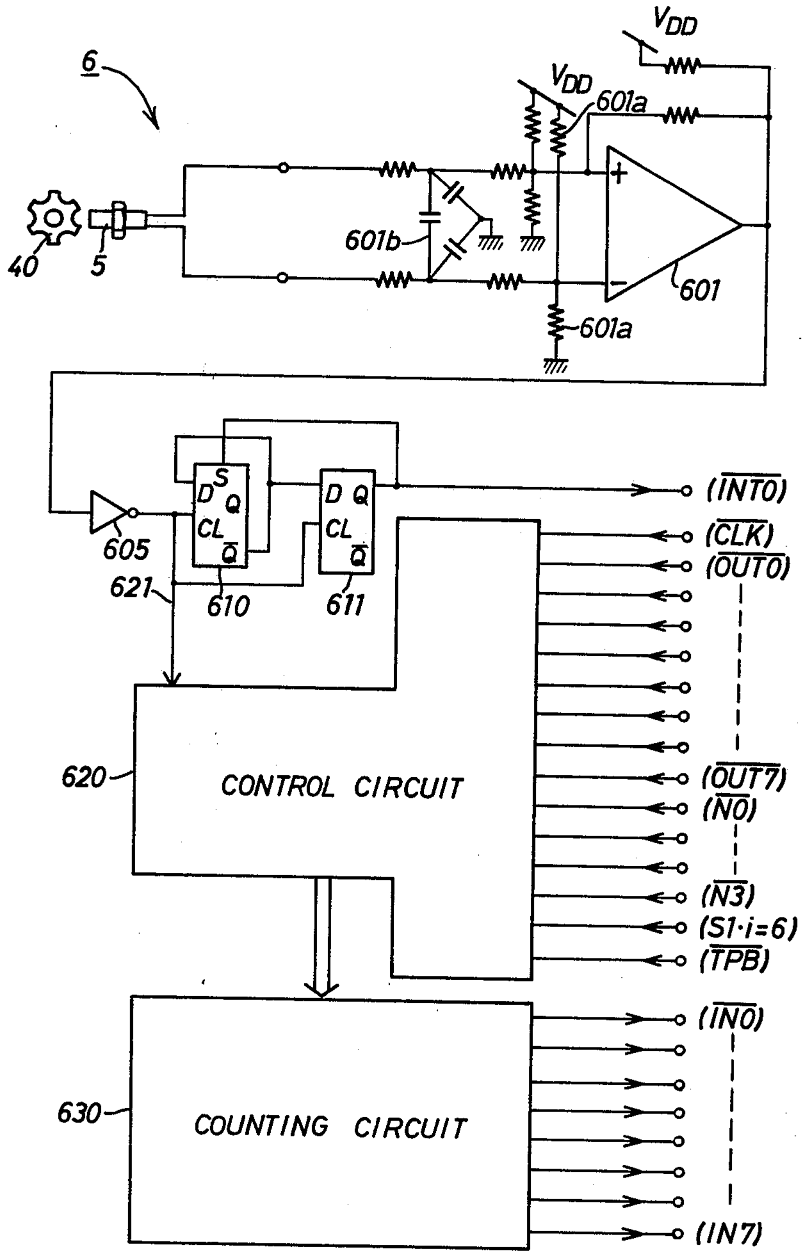
FIG. 2 is a circuit diagram of an embodiment of the rotation speed detector illustrated in block form in FIG. 1.
Figure 4:
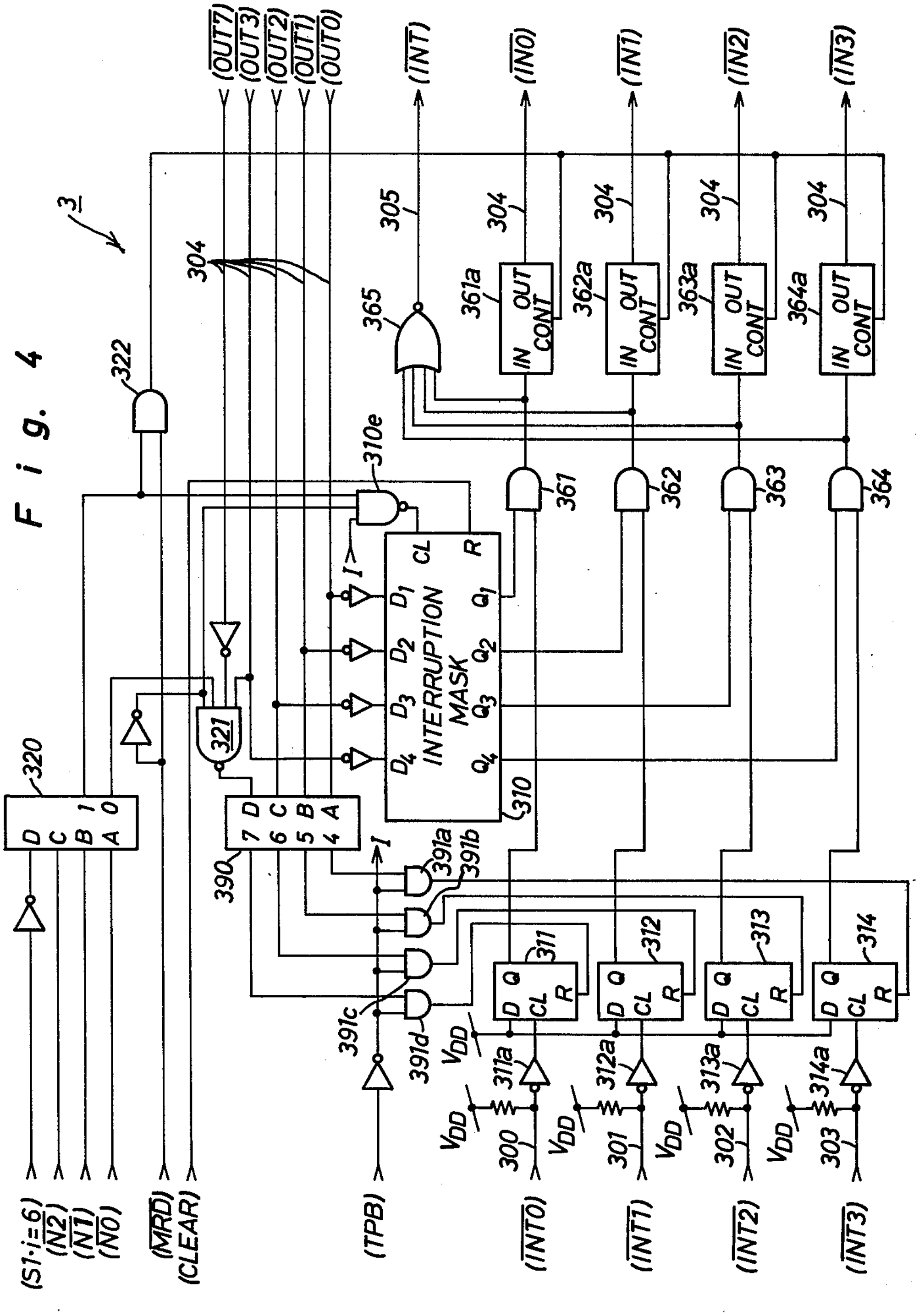
FIG. 4 is a circuit diagram of an embodiment of the interrupt controller illustrated in block form in FIG. 1.

Hereinafter, a preferred embodiment of the rotation speed detector 6 will be described in detail with reference to FIG. 2. In the embodiment, the rotation speed detector 6 comprises a low pass filter **601*b* for filtering angular pulses generated from the magnetic pickup transducer 5 and a comparator 601 for comparing the angular pulses filtered by the low pass filter 601*b* with a reference signal from a voltage divider including resistors 601*a* to generate output signals applied to a Schmitt trigger circuit 605, which may be, for example, type CD4093 manufactured by RCA. The Schmitt trigger circuit 605 sharply reshapes the form of output signals of the comparator 601. The reshaped output signals are applied via line 621 to a frequency divider including first and second D flip-flops 610 and 611. The frequency divider divides each of the reshaped output signals on line 621 by one third in frequency and applies the divided signals as synchronized pulses $\overline{\text{INT0}}$ (i.e. synchronized with the rotation of crank shaft 21) to an inverter 311*a* of the interrupt controller 3 through a line 300, as shown in FIG. 4. The Schmitt trigger circuit 605 also applies the reshaped output signals on line 621 to a control circuit 620. The control circuit 620 functions to apply the reshaped output signals on line 621 from the Schmitt trigger circuit 605 to a counting circuit 630 in accordance with data output signals $\overline{\text{OUT0}}$ to $\overline{\text{OUT7}}$ and N code output signals $\overline{\text{N0}}$ to $\overline{\text{N3}}$ issued from the microprocessor of the computer 1. The counting circuit 630 comprises a sixteen-bit binary counter for counting each period of the reshaped output signals on line 621 and a register for receiving the counted results from the binary counter and transferring them to the computer 1 as input signals $\overline{\text{IN0}}$ to $\overline{\text{IN7}}$, which represent the instantaneous rotational speed of the crank shaft 21**. By way of example, the output from the sixteen-bit binary counter assume the following values in relation to the engine rotational speed.

| SPEED OF ENGINE ROTATION | COUNTED RESULT IN HEXADECIMAL NOTATION |
|---|---|
| 300 r.p.m. | 8235 |
| 600 | 411A |
| 6000 | 0682 |

From the above relationships it may be appreciated that the outputs counted results of the binary counter are inversely proportional to the speed of engine rotation.

In operation of the rotation speed detector 6 in relation to the programming process in the computer 1, the rotation speed detector 6 is selected from the interface circuit by an instruction word "OUT 5, #10" issued from the computer 1 to the control circuit 620 so that the period of each reshaped output signal on line 621 will be counted by the binary counter of the counting circuit 630. The counted results of the binary counter are transferred to the register in the counting circuit 630 by an instruction word "OUT 0, 0" issued from the computer 1. Then, the low-order eight bits of the counted results are read into an address of the memory defined by a register RB in the computer 1 by means of an instruction word "INP 1" issued from the computer 1. For instance, when the engine rotates at 6000 r.p.m., the low-order eight bits 82 of 0682 in hexadecimal notation will be read into the computer 1. The high-order eight bits of the counted results are read into another address of the memory by means of an instruction word "INP 2" issued from the computer 1. For instance, when the engine rotates at 6000 r.p.m., the high-order eight bits 06 of 0682 in hexadecimal notation will be read into the computer 1. Thus, it should be understood that each period of the reshaped output signals on line 621 from the Schmitt trigger circuit 605 will be counted in the counting circuit 630 and read into the specific addresses of the memory in the computer 1 by means of the respective instruction words transferred to the control circuit 620 from the computer 1.

Figure 3:
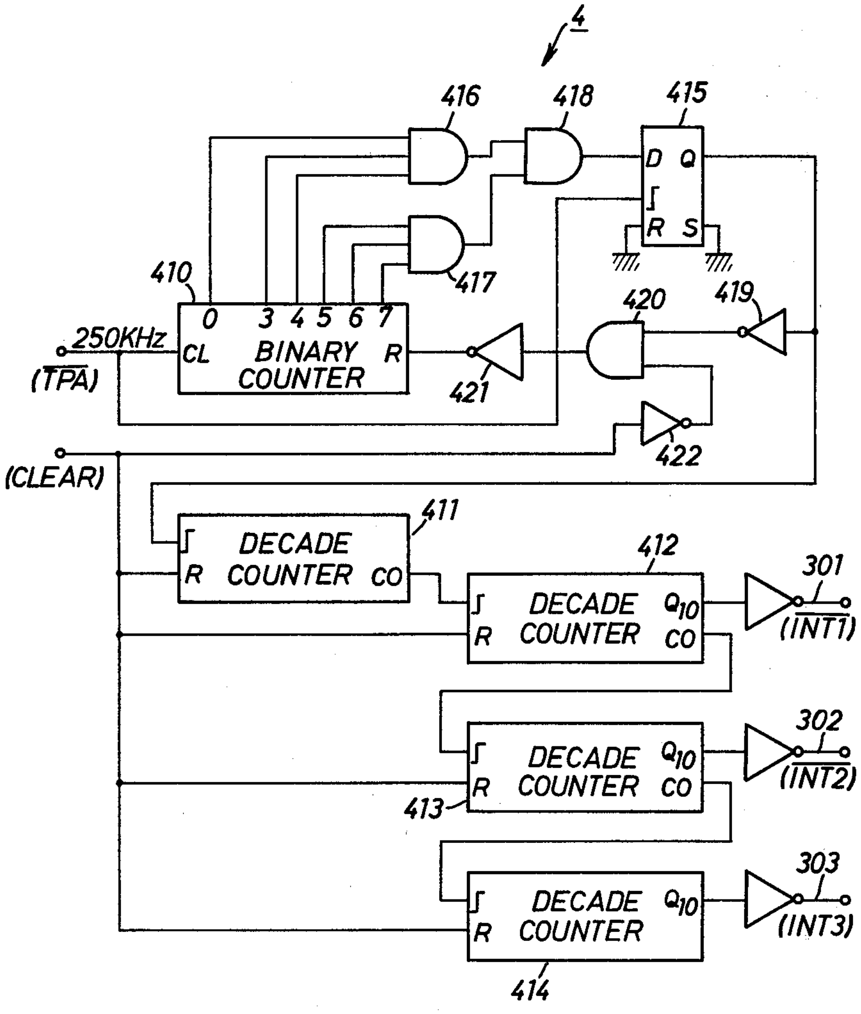
FIG. 3 is a circuit diagram of an embodiment of the clock circuit illustrated in block form in FIG. 1.

In FIG. 3, the clock circuit 4 comprises an eight-bit binary counter 410, which may comprise, for example, a C-MOS IC type CD4040 manufactured by RCA, which functions to count a timing pulse $\overline{\text{TPA}}$ of 250 (KHz) issued from the computer 1 and to apply the counted results to a frequency divider including AND-gates 416 to 418, a D flip-flop 415, inverters 419, 421 and 422 and an AND-gate 420. The frequency divider functions to frequency divide each counted result of the binary counter 410 by 250 to generate clock pulses of 1 KHz. at the output terminal Q of the D flip-flop 415. A decade counter 411 functions to frequency divide each clock pulse of 1 KHz. by ten. Subsequently, each divided clock pulse of 100 Hz. is further frequency divided by ten by a decade counter 412. The 10 Hz. divided pulses are applied as first clock pulses $\overline{\text{INT1}}$ to an inverter **312*a* of the interrupt controller 3 (see FIG. 4) through an inverter and line 301, and are also applied to a decade counter 413. The decade counter 413 functions to frequency divide each first clock pulse $\overline{\text{INT1}}$ by ten and to apply the 1 Hz. divided clock pulses as second clock pulses $\overline{\text{INT2}}$ to an inverter 313*a* of the interrupt controller 3 (FIG. 4) through an inverter and line 302. A further decade counter 414 receives each second clock pulse $\overline{\text{INT2}}$ of 1 Hz. from the decade counter 413 and frequency divides it again by ten. The 0.1 Hz. divided second clock pulses are applied as third clock pulses $\overline{\text{INT3}}$ to an inverter 314*a* of the interrupt controller 3 (FIG. 4) through an inverter and line 303. The decade counters 411 to 414 may preferably comprise C-MOS ICs type CD4017 manufactured by RCA. Thus, the clock pulses $\overline{INT1}$ to $\overline{INT3}$ of 100 msec., 1 sec. and 10 sec. are respectively obtained by dividing the clock pulses of 1 msec. from the D flip-flop 415** of the frequency divider.

Figure 5:
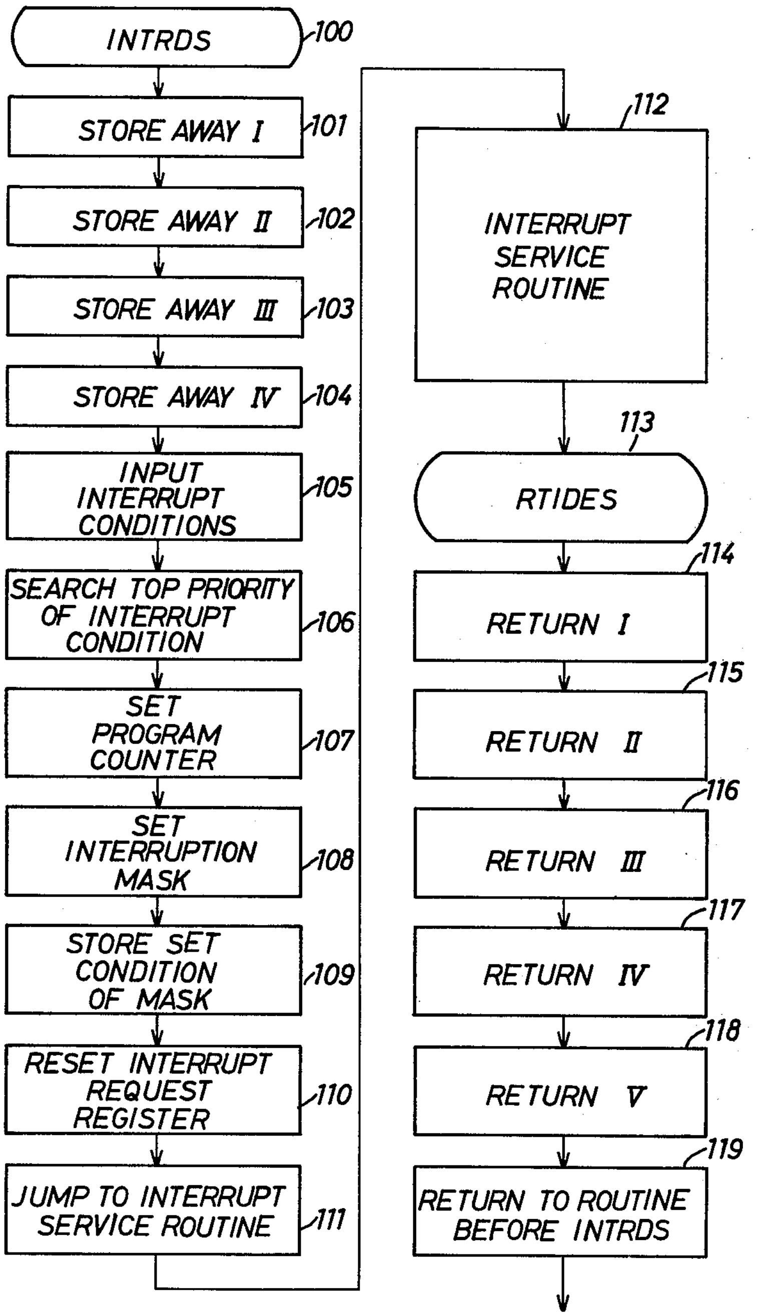
FIG. 5 is a flow diagram illustrative of the operation of the digital computer in relation to the interrupt controller of the present invention.

A preferred embodiment of the interrupt controller 3 will be described below in detail with reference to FIGS. 4 and 5. The interrupt controller 3 comprises four interrupt request registers or D flip-flops 311 to 314, and a multi-level interruption mask 310 using a parallel-in-parallel out register. The first interrupt request register 311 receives at its input terminal CL the synchronized pulse $\overline{INT0}$ through the inverter 311*a* to generate high-level signals at its output terminal Q. The second, third and fourth interrupt request registers 312, 313 and 314 respectively receive at their input terminals CL the first, second and third clock pulses $\overline{INT1}$, $\overline{INT2}$ and $\overline{INT3}$ through the inverters 312*a*, 313*a* and 314*a* to generate high-level signals at their output terminals Q. The interrupt request registers 311 to 314 are respectively reset by reset signals applied to their reset terminals R from four AND-gates 391*a* to 391*d* to generate low-level signals at their output terminals Q.

The multi-level interruption mask 310 receives at its input terminals $D_1$ to $D_4$ signals $\overline{OUT0}$ to $\overline{OUT3}$ responsive to an instruction word "OUT 6, #OM" (M=0, 1, 2 . . . , F in hexadecimal notation) issued from the computer 1 and simultaneously receives at its terminal CL a set signal responsive to the instruction word "OUT 6, #OM" transferred from the computer 1 through a NAND-gate 310*e* to generate high or low level control signals at its output terminals $Q_1$ to $Q_4$. The interruption mask 310 is reset upon receiving at its reset terminal R a reset signal issued from the computer 1 to generate high-level control signals at its output terminals $Q_1$ to $Q_4$.

If low-level control signals appear at the terminals $Q_1$ to $Q_4$ of the interruption mask 310, four AND-gates 361 to 364 cannot be turned on in response to signals from the registers 311 to 314. In this case, output signals of the AND-gates 361 to 364 are maintained at a low-level so that a NOR-gate 365 will issue a high-level signal which is applied as an interrupt prohibit signal to the computer 1 through line 305.

If high and low level signals respectively appear at the terminals $Q_1$ and $Q_2$ and the terminals $Q_3$ and $Q_4$ of the mask 310, the AND-gates 361 and 362 can be turned on in response to signals from the registers 311 and 312, while the AND-gates 363 and 364 cannot be turned on in response to signals from the registers 313 and 314. In this instance, the AND-gates 361 and 362 issue high-level signals upon receiving high-level signals from the registers 311 and 312 and then the NOR-gate 365 issues a low-level signal which is applied as an interrupt request signal $\overline{INT}$ to the computer 1 through the line 305. (This corresponds to an interrupt description or INTRDS step shown at 100 in FIG. 5.)

The interrupt controller 3 further comprises a BCD-to-decimal decoder 320 to control the AND-gates 391*a* to 391*d*, the NAND-gate 310*e* and an AND-gate 322.

Assume, for example, that the interrupt prohibit signal from the NOR-gate 365 is transferred to the computer 1 during a calculation in the computer 1 responsive to a synchronized pulse $\overline{INT0}$. The computer 1 will then continue its calculation responsive to the synchronized pulse $\overline{INT0}$.

If the interrupt request signal $\overline{INT}$ from the NOR-gate 365 is transferred to the computer 1 during a calculation in the computer 1 responsive to the second clock pulse $\overline{INT2}$ from the clock circuit 4, the computer 1 discontinues the calculation responsive to the second clock pulse $\overline{INT2}$ to store the calculated data based thereon in a selected portion thereof. (This corresponds to store-away steps I to IV shown at 101 to 104 in FIG. 5.) Subsequently, the computer 1 issues an instruction word "INP 6" which is applied as a signal (Sl·i=6) to a terminal D of the decoder 320. At the same time, the decoder 320 receives at its terminals A to C signals $\overline{N0}$ to $\overline{N2}$ responsive to the instruction word "INP 6" from the computer 1. Then, the signals $\overline{N0}$ to $\overline{N2}$ are decoded by the decoder 320 into a high-level signal appearing at a terminal, denoted by the digit 1, of the decoder 320.

The AND-gate 322 receives the high-level signal from the decoder 320 and a high-level signal $\overline{MRD}$ issued from the computer 1 responsive to the instruction word "INP 6" so that a high-level signal appears at the output terminal of the AND-gate 322. When such a high-level signal appears at the output terminal of the AND-gate 322, four switching circuits 361*a* to 364*a* are turned on to permit transfer of the high-level signals from the AND-gates 361 and 362 and the low-level signals from the AND-gates 363 and 364 to the memory of the computer 1 through line 304. (This corresponds to the step for inputting interrupt conditions shown at 105 in FIG. 5.) Then, the high-level signal responsive to the synchronized pulse $\overline{INT0}$ is selected in the computer 1 such that a program number for a calculation responsive to the high-level signal from the switching circuit 361*a* will be set in a program counter PC of the computer 1. (This corresponds to the steps of searching a top priority of an interrupt condition and of setting the program counter PC shown at 106 and 107 in FIG. 5.) Upon setting the program number of the calculation in the program counter PC, the computer 1 issues an instruction word "OUT 6, #00" which is applied to the terminal D of the decoder 320. At the same time, the decoder 320 receives at its terminals A to C signals $\overline{N0}$ to $\overline{N2}$ responsive to the instruction word "OUT 6, #00" from the computer 1. Then, the signals $\overline{N0}$ to $\overline{N2}$ are decoded by the decoder 320 into a high-level signal appearing at the terminal, denoted by the digit 1, of the decoder 320.

The NAND-gate 310*e* receives the high-level signal from the decoder 320, a low-level signal $\overline{MRD}$ issued from the computer 1 responsive to the instruction word "OUT 6, #00" and a timing pulse TPB of a low-level issued from the computer 1. As a result, the NAND-gate 310*e* generates at its output terminal a set signal which is applied to the terminal CL of the mask 310. Under this condition, the mask 310 receives at its terminals $D_1$ to $D_4$ high-level signals $\overline{OUT0}$ to $\overline{OUT3}$ responsive to the instruction word "OUT 6, #00" issued from the computer 1 to generate low-level signals at its terminals $Q_1$ to $Q_4$. (This corresponds to the step of setting the mask 310 shown at 108 in FIG. 5.) In this instance, the previous set condition of the mask 310 for the calculation responsive to the second clock pulse $\overline{INT2}$ is stored in the RAM of the computer 1. (This corresponds to the step of storing a previous set condition of the mask 310 shown at 109 in FIG. 5.)

Thereafter, the computer 1 issues an instruction word "OUT 7, #80", which is applied as a signal (Sl·i=6) to the terminal D of the decoder 320. At the same time, the decoder 320 receives at its terminals A to C signals $\overline{N0}$ to $\overline{N2}$ responsive to the instruction word "OUT 7, #80" issued from the computer 1. Then, the signals $\overline{N0}$ to $\overline{N2}$ are decoded by the decoder 320 into a high-level signal appearing at a terminal, denoted by the digit 0, of the decoder 320. A NAND-gate 321 receives the high-level signal from the decoder 320 and low-level signals $\overline{MRD}$ and $\overline{OUT7}$ and a high-level signal $\overline{OUT3}$ responsive to the instruction word "OUT 7, #80" issued from the computer 1. As a result, the NAND-gate 321 generates a low-level signal which is applied to a terminal D of a BCD-to-decimal decoder 390. Simultaneously, the decoder 390 receives at its terminals A to C signals $\overline{OUT0}$ to $\overline{OUT2}$ responsive to the instruction word "OUT 7, #80" issued from the computer 1. Then, the signals $\overline{OUT0}$ to $\overline{OUT2}$ are decoded by the decoder 390 into a high-level signal appearing at a terminal, denoted by the digit 7, of the decoder 390. Subsequently, the AND-gate 391*d* receives the high-level signal from the decoder 390 and the timing pulse TPB of a low-level issued from the computer 1 to generate a reset signal of a high-level which is applied to the terminal R of the register 311. Thus, the register 311 is reset to activate the AND-gate 361 upon receiving the next synchronized pulse $\overline{INT0}$ from the rotational speed detector 6. (This corresponds to the step of resetting the interrupt request register shown at 110 in FIG. 5.)

After the resetting of the register 311, the program number previously set in the program counter PC is conditioned to execute the calculation that is responsive to the preceding synchronized pulse $\overline{INT0}$. (This corresponds to the steps of jumping to an interrupt service routine and of executing it, shown at 111 and 112 of FIG. 5.) During this execution of the calculation responsive to the preceding synchronized pulse $\overline{INT0}$, first values for optimum actuation or operation of the ignition coil 14 and the fuel injectors 19 are mathematically calculated from an algebraic function describing a desired relationship between the conditions of the engine and the settings of the ignition coil 14 and the fuel injectors 19, the calculation being based on an algebraic function being previously programmed in the PROM of the computer 1 as described hereinafter in detail. When the above-mentioned calculation is completed, the spark timing logic circuit 13 and the fuel injection control logic circuit 18 receive the calculated values from the computer 1 through the data bus 2. Thus, the operation of the ignition coil 14 and the fuel injectors 19 will be controlled by control pulses from the ignitor 15 and the injector drive circuit 22.

After the calculation responsive to the preceeding synchronized pulse $\overline{INT0}$ just described, the calculated data responsive to the second clock pulse $\overline{INT2}$, which was previously stored in the RAM of the computer 1 (steps 101 through 104 of FIG. 5), is read out and the previous set condition of the mask 310, which is stored in the RAM of the computer 1 (step 109, FIG. 5), is set instead of the set condition corresponding to the instruction word "OUT 6, #00". Then, only the AND-gate 362 will generate a high-level signal upon receiving a high-level signal from the mask 310 and, in turn, the NOR-gate 365 will issue the interrupt request signal $\overline{INT}$ in response to the high-level signal from the AND-gate 362. When the interrupt request signal $\overline{INT}$ is transferred to the computer 1, the calculated data responsive to the second clock pulse $\overline{INT2}$ is stored again in the computer 1 and the instruction word "INP 6" is issued from the computer 1 as the signal (Sl·i=6), which is applied to the terminal D of the decoder 320. Thereafter, as described above with respect to the setting of the interrupt controller 3 for the calculation responsive to the synchronized pulse $\overline{INT0}$, the switching circuits 361*a* to 364*a* are turned on to permit transfer of the high-level signal from the AND-gate 362 and the low-level signals from the AND-gates 363 and 364 to the memory of the computer 1 (step 105), and a program number for a calculation responsive to the first clock pulse $\overline{INT1}$ is set in the program counter PC (step 107). Subsequently, the computer 1 issues an instruction word "OUT 6, #01" which is applied as a signal (Sl·i=6) to the terminal D of the decoder 320. Then, the mask 310 generates a high-level signal at its terminal $Q_1$ and low-level signals at its terminals $Q_2$ to $Q_4$. Further, the computer 1 issues an instruction word "OUT 7, #81" which is applied as a signal (Sl·i=6) to the terminal D of the decoder 320. Then, the decoder 390 generates a high-level signal at a terminal denoted by the digit 6, the AND-gate 391*c* generates a reset signal of a high-level, and the register 312 is reset to activate the AND-gate 362 upon receiving the next clock pulse $\overline{INT1}$ from the clock circuit 4.

After the reset of the register 312, a calculation responsive to the preceding first clock pulse $\overline{INT1}$ is executed. During the execution of this calculation responsive to the first clock pulse $\overline{INT1}$, second values for optimum setting of the EGR valve 24 are mathematically calculated from an algebraic function describing another desired relationship between the conditions of the engine and the setting of the EGR valve 24, the calculation being based on an algebraic function being previously programmed in the computer 1 as described hereinafter in detail. When this calculation is completed, the latch circuit 23 receives the calculated values from the computer 1 through the data bus 2. Then, the setting of the EGR valve 24 will be controlled by a control pulse from the power amplifier 27.

After the calculation responsive to the first clock pulse $\overline{INT1}$, the calculated data responsive to the second clock pulse $\overline{INT2}$, which was previously stored in the computer 1, is again read out, and the previous set condition of the mask 310 is again set instead of the set condition corresponding to the instruction word "OUT 6, #01". Then, the calculation responsive to the second clock pulse $\overline{INT2}$ is again executed. (This step includes a return from the interrupt description or RTIDES, returns I to V and a return to a routine before INTRDS shown at 113 to 119 in FIG. 5.) During the execution of the calculation responsive to the second clock pulse $\overline{INT2}$, various compensation data are mathematically calculated from a further algebraic function describing a further desired relationship between the conditions of the engine and the conditions of operation or actuation of the ignition coil 14 and the fuel injectors 19 in such a manner that the compensation data are temporarily stored in the RAM of the computer 1 to compensate the first values calculated responsive to the synchronizing pulse $\overline{INT0}$, the calculation based on the algebraic function being previously programmed in the computer 1 as described hereinafter in detail.

After the calculation responsive to the second clock pulse $\overline{INT2}$, the mask 310 is reset upon receiving at its terminal R the reset signal issued from the computer 1 to generate high-level signals at its terminals $Q_1$ to $Q_4$. Thus, only the AND-gate 364 issues a high-level signal upon receiving the high-level signal from the mask 310 and, in turn, the NOR-gate 365 issues the interrupt request signal $\overline{INT}$ in response to the high-level signal from the AND-gate 364. When the interrupt request signal $\overline{INT}$ is transferred to the computer 1, the instruction word "INP 6" is issued from the computer 1, the switching circuits 361*a* to 364*a* are turned on to permit transfer of the low-level signals from the AND-gates 361 to 363 and the high-level signal from the AND-gate 364 to the memory of the computer 1, and a program number for a calculation responsive to the third clock pulse $\overline{INT3}$ is set in the program counter PC. Subsequently, the computer 1 issues an instruction word "OUT 6, #07", and the mask 310 generates high-level signals at its terminals $Q_1$ to $Q_3$ and a low-level signal at its terminal $Q_4$. Further, when the computer 1 issues an instruction word "OUT 7, #83", the decoder 390 generates a high-level signal at a terminal denoted by the digit 4, the AND-gate 391*d* generates a reset signal of high-level, and the register 314 is reset to activate the AND-gate 364 upon receiving the next clock pulse $\overline{INT3}$ from the clock circuit 4.

After the resetting of the register 314, the calculation responsive to the third clock pulse $\overline{INT3}$ is executed. During the execution of the calculation responsive to the third clock pulse $\overline{INT3}$, various compensation data are mathematically calculated from still another algebraic function describing still another desired relationship between the conditions of the engine and the conditions of operation or actuation of the ignition coil 14 and the fuel injectors 19 in such a manner that the compensation data are temporarily stored in the RAM of the computer 1 to compensate the first values calculated responsive to the synchronizing pulse $\overline{INT0}$, this calculation being based on the algebraic function being previously programmed in the computer 1 as described hereinafter in detail.

From the above detailed description, it should be clearly understood that the interrupt controller 3 functions relative to the computer 1 as follows.

1. During execution of the calculation responsive to a synchronized pulse $\overline{INT0}$ in the computer 1, the interruption mask 310 is set in accordance with the instruction word "OUT 6, #00" issued from the computer 1 to generate low-level signals at its terminals $Q_1$ to $Q_4$ and the interrupt request register 311 is reset in accordance with the instruction word "OUT 7, #80" issued from the computer 1 to generate a high-level signal upon receiving the next synchronized pulse $\overline{INT0}$. In this state, the output signals of the AND-gates 361 to 364 are respectively maintained in a low-level, even if the registers 311 to 314 respectively receive the next synchronized pulse $\overline{INT0}$ and first, second and third clock pulses $\overline{INT1}$, $\overline{INT2}$ and $\overline{INT3}$. Thus, the computer 1 will continue the execution of the calculation responsive to the synchronized pulse $\overline{INT0}$ due to the interrupt prohibit signal that is continuously transferred from the NOR-gate 365.

2. During execution of the calculation responsive to a first clock pulse $\overline{INT1}$ in the computer 1, the mask 310 will be set in accordance with the instruction word "OUT 6, #01" to generate a high-level signal at its terminal $Q_1$ and low-level signals at its terminals $Q_2$ to $Q_4$, and the register 312 is then reset in accordance with the instruction word "OUT 7, #81" to generate a high-level signal upon receiving the next first clock pulse $\overline{INT1}$. In this state, when the registers 311 to 314 respectively receive a synchronized pulse $\overline{INT0}$ and first, second and third clock pulses $\overline{INT1}$, $\overline{INT2}$ and $\overline{INT3}$, only the AND-gate 361 generates a high-level signal applied to the NOR-gate 365, and output signals of the AND-gates 362 to 364 are respectively maintained in a low-level. Thus, the computer 1 receives the interrupt request signal $\overline{INT}$ from the NOR-gate 365 to discontinue the calculation responsive to the first clock pulse $\overline{INT1}$ and execute the calculation responsive to the synchronized pulse $\overline{INT0}$. After the calculation responsive to the synchronized pulse $\overline{INT0}$, the computer 1 will again execute the calculation responsive to the first clock pulse $\overline{INT1}$, and thereafter will execute the calculations respectively responsive to the second and third clock pulses $\overline{INT2}$ and $\overline{INT3}$ in sequence.

3. During execution of the calculation responsive to a second clock pulse $\overline{INT2}$ in the computer 1, the mask 310 will be set in accordance with the instruction word "OUT 6, #03" to generate high-level signals at its terminals $Q_1$ and $Q_2$ and low-level signals at its terminals $Q_3$ and $Q_4$, and the register 313 is reset in accordance with the instruction word "OUT 7, #82" to generate a high-level signal upon receiving the next second clock pulse $\overline{INT2}$. In this state, when the registers 311 to 314 respectively receive a synchronized pulse $\overline{INT0}$ aand first, second and third clock pulses $\overline{INT1}$, $\overline{INT2}$ and $\overline{INT3}$, the AND-gates 361 and 362 generate high-level signals applied to the NOR-gate 365, and output signals of the AND-gates 363 and 364 are maintained in a low-level. Thus, the computer 1 receives the interrupt request signal $\overline{INT}$ from the NOR-gate 365 to discontinue the calculation responsive to the second clock pulse $\overline{INT2}$ and execute the calculation responsive to the synchronizing pulse $\overline{INT0}$. After the calculation responsive to the synchronized pulse $\overline{INT0}$, the computer 1 will execute the calculation responsive to the first clock pulse $\overline{INT1}$, thereafter will execute again the calculation responsive to the second clock pulse $\overline{INT2}$ and finally will execute the calculation responsive to the third clock pulse $\overline{INT3}$.

4. During execution of the calculation responsive to a third clock pulse $\overline{INT3}$ in the computer 1, the mask 310 is set in accordance with the instruction word "OUT 6, #07" to generate high-level signals at its terminals $Q_1$ to $Q_3$ and a low-level signal at its terminal $Q_4$, and the register 314 is reset in accordance with the instruction word "OUT 7, #83" to generate a high-level signal upon receiving the next third clock pulse $\overline{INT3}$. In this state, when the registers 311 to 314 respectively receive a synchronized pulse $\overline{INT0}$ aand first, second and third clock pulses $\overline{INT1}$, $\overline{INT2}$ and $\overline{INT3}$, only an output signal of the AND-gate 364 is maintained in a low-level, and the remaining AND-gates 361 to 363 each generate high-level signals that are applied to the NOR-gate 365. Thus, the computer 1 receives the interrupt request signal $\overline{INT}$ from the NOR-gate 365 to discontinue the calculation responsive to the third clock pulse $\overline{INT3}$ and will then execute the calculation responsive to the synchronized pulse $\overline{INT0}$. After the calculation responsive to the synchronized pulse $\overline{INT0}$, the computer 1 will execute the calculations responsive to the first and second clock pulses $\overline{INT1}$ and $\overline{INT2}$ in sequence, and finally will again execute the calculation responsive to the third clock pulse $\overline{INT3}$.

In the practice of the present invention, the computer 1 is programmed in such a manner that the calculations in the computer 1 are executed based on the following Tables 1 to 4.

TABLE 1

(SERVICE ROUTINE RESPONSIVE TO A SYNCHRONIZED PULSE $\overline{INT0}$)

(1) Calculate the spark advance of the engine in relation to the negative pressure appearing upstream of the throttle valve 29.
(2) Calculate the spark retard of the engine in relation to the negative pressure appearing downstream of the throttle valve 29, based on the result calculated at (1) of Table 1.
(3) Transfer the results calculated at (2) of Table 1, (1) of Table 2 and (1) of Table 3 to the spark timing logic circuit 13.
(4) Calculate the energizing duration of the primary winding of the ignition coil 14.
(5) Transfer the result calculated at (4) of Table 1 to the spark timing logic circuit 13.
(6) Calculate F/E, the character F representing the amount of air flowing into the intake manifold **30*b*** and the character E representing the rotational speed of the engine.
(7) Transfer the results calculated at (6) of Table 1, (2) of Table 2, (2) of Table 3, and (2) and (3) of Table 4 to the fuel injection control logic circuit 18.

TABLE 2

(SERVICE ROUTINE RESPONSIVE TO A FIRST CLOCK PULSE $\overline{INT1}$)

(1) Calculate the spark advance in relation to the rotational speed of the engine.
(2) Calculate the added amount of fuel injected from the injectors 19 during acceleration of the engine.
(3) Calculate the amount of exhaust gas recirculation in relation to the coolant temperature and the rotational speed of the engine.
(4) Transfer the result calculated at (3) of Table 2 to the latch circuit 23.

TABLE 3

(SERVICE ROUTINE RESPONSIVE TO A SECOND CLOCK PULSE $\overline{INT2}$)

(1) Calculate the time delay characteristics of the spark advance in relation to the negative pressure appearing upstream and downstream of the throttle valve 29.
(2) Calculate the added; amount of fuel injected from the fuel injectors 19 after starting the engine.

TABLE 4

(SERVICE ROUTINE RESPONSIVE TO A THIRD CLOCK PULSE $\overline{INT3}$)

(1) Calculate the value of temperature compensation in relation to the negative pressure appearing at the upstream and downstream of the throttle valve 29.
(2) Calculate the added amount of fuel injected from the fuel injectors 19 in relation to the coolant temperature of the engine.
(3) Calculate the added amount of fuel injected from the fuel injectors 19 in relation to the temperature in the induction passage **30*a***.

While a calculation responsive to a synchronized pulse $\overline{INT0}$ is executed in the computer 1 (under a program which may be written by a programmer of ordinary skill pursuant to Table 1), the interface controller 39 is activated by the control signal 41 from the computer 1 to control the rotation speed detector 6 and the analog multiplexer 7 such that various pulses from the rotation speed detector 6 and the analog multiplexer 7 are entered as binary numbers into the computer 1 by way of the data bus 2. The values calculated in the computer 1 are transferred by way of the data bus 2 to the spark timing logic circuit 13 and the fuel injection control logic circuit 18 under control of the interface controller 39. Thus, optimum operation or actuation of the ignition coil 14 and the injectors 19 will be established by control signals from the ignitor 15 and the injector drive circuit 22.

Having now fully set forth both the structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electrical control apparatus adapted for use with a combustion engine having an output shaft driven by mechanical energy converted from heat energy caused by the combustion of an air-fuel mixture, said engine including first and second control means for controlling the combustion of said air-fuel mixture in accordance with changes of a condition of said engine, said apparatus comprising:

a first electrical circuit for generating an electrical signal in the form of a binary number, said signal indicating a condition of said engine as of a selected instant in time during operation of said engine;

a digital computer for repetitively and sequentially calculating first and second values corresponding to respective settings of said first and second control means by receiving therein said electrical signal, said computer being programmed to calculate said first and second values from a first function describing a desired relationship between the condition of said engine and the setting of said first control means and from a second function describing another desired relationship between the condition of said engine and the setting of said second control means;

a second electrical circuit coupled between said digital computer and said first and second control means for converting said first and second values into the settings of said first and second control means;

a detector for generating a synchronized pulse which is synchronized with and in response to the rotation of said output shaft, said computer initiating calculation of said first value in response to receipt of said synchronized pulse;

a clock circuit for generating at least one clock pulse in a predetermined time interval, said computer initiating calculation of said second value in response to receipt of said clock pulse; and an interrupt controller for receiving said synchronized pulse and said clock pulse and for causing said computer to initiate calculation of said first value upon receiving said synchronized pulse during the calculation of said second value in said computer, and to subsequently complete the calculation of said second value after said first value has been calculated.

2. An electrical control apparatus as claimed in claim 1, wherein said first control means includes means for controlling the amount of the air-fuel mixture metered into said engine and means for controlling the spark-ignition timing of said engine, and wherein said first electrical circuit includes means for generating a binary number electrical signal indicating the rotational speed of said output shaft during operation of said engine.

3. An electrical control apparatus as claimed in claim 1, wherein said second control means includes means for recirculating exhaust gases caused by the combustion of the air-fuel mixture into said engine and said first electrical circuit includes means for generating a binary number electrical signal indicating changes of in the coolant temperature of said engine.

4. An electrical control apparatus as claimed in claim 1, wherein said digital computer includes means for repetitively calculating a third value to sequentially compensate said first and second values by receiving said electrical signal, said computer being further programmed to calculate said third value from a third function describing a desired relationship between the condition of said engine and said first and second values.

5. An electrical control apparatus as claimed in claim 4, wherein said clock circuit comprises a frequency divider for converting a timing pulse issued from said computer into at least two clock pulses for causing said computer respectively to perform the calculations of said second and third values in said computer, said clock pulses being different in frequency in such a manner that the frequency of a first clock pulse is larger than that of a second clock pulse, and wherein said interrupt controller is connected to receive said synchronized pulse and said first and second clock pulses so as to cause said computer to calculate said first value upon receiving said synchronized pulse during the calculation of said third value and to subsequently calculate said second value upon receiving said second clock pulse after calculating said first value, whereafter said interrupt controller causes said computer to complete calculation of said third value after completion of the calculation of the second value.

6. An electrical control apparatus as claimed in claim 1, wherein the time interval of said clock pulse is larger than that of said synchronized pulse generated from said detector during the idling of said engine.

7. An electrical control apparatus as claimed in claim 1, wherein said detector comprises a transducer electrically operated in response to the rotational speed of said output shaft to generate angular pulses, a comparator for comparing each of said angular pulses with a reference signal, and a frequency divider for frequency dividing each output pulse issued from said comparator to generate said synchronized pulses having a variable time interval in accordance with changes in the rotational speed of said output shaft.

8. An electrical control apparatus as claimed in claim 7, wherein said detector further comprises:

a counting circuit having a counter for receiving said output pulses from said comparator to count time intervals of said output pulses and a register for transferring the output of said counter as a binary number speed signal to said computer in response to an instruction word therefrom; and a control circuit for transferring the output pulses from said comparator to said counter of said counting circuit in accordance with said instruction word.

9. An electrical control apparatus as claimed in claim 1, wherein said clock circuit comprises a frequency divider for converting a timing pulse issued from said computer into at least one clock pulse with a predetermined frequency.

10. An electrical control apparatus as claimed in claim 1, wherein said interrupt controller comprises first and second registers for selectively generating an output signal of a high-level upon receiving said synchronized pulse and said clock pulse; an interruption mask for generating at its first and second terminals output signals of a low-level during the calculation of said first value in said computer and for generating at its first terminal an output signal of a high-level and at its second terminal an output signal of a low-level during the calculation of said second value in said computer; and a logic circuit for issuing an interrupt prohibit signal upon receiving output signals of a low-level from said first and second terminals of said interruption mask and for issuing an interrupt request signal upon receiving an output signal of a high-level from said first register and an output signal of a high-level from said first terminal of said mask during the calculation of said second value for causing said first value to be calculated in response to said interrupt request signal.

11. A method for controlling a combustion engine having an output shaft driven by mechanical energy converted from heat energy caused by the combustion of an air-fuel mixture, said engine including first and second control means for controlling the combustion of said air-fuel mixture in accordance with changes in a condition of said engine, said method comprising the steps of:

a. generating an electrical signal in the form of a binary number, the signal indicating a condition of said engine as of a selected instant in time during operation of said engine;

b. generating a synchronized pulse as part of a pulse train synchronized with and in response to the rotational speed of said output shaft;

c. generating at least one clock pulse in a predetermined time interval;

d. sequentially calculating first and second values corresponding to respective settings of said first and second control means by a computer programmed to calculate said first and second values from a first function describing a desired relationship between the condition of said engine and the setting of said first control means and from a second function describing another desired relationship between the condition of said engine and the setting of said second control means, the calculations of said first and second values being respectively performed using said binary number electrical signal in accordance with said synchronized pulse and said clock pulse such that the calculation of said first value is conducted first by said computer in response to receipt of said synchronized pulse even during the calculation of said second value, and the rest of the calculation of said second value is subsequently conducted after completion of the calculation of said first value;

e. converting said first and second calculated values into the settings of said first and second control means; and f. continuously repeating the above sequence of steps for controlling the combustion of the air-fuel mixture in response to any changes in said binary number electrical signal.

12. A method for controlling a combustion engine as claimed in claim 11, wherein said first control means includes means for controlling the amount of air-fuel mixture metered into said engine and means for controlling the spark-ignition timing of said engine, and wherein the step of generating a binary number electrical signal indicative of a condition of said engine includes the step of generating a binary number electrical signal indicating the rotational speed of said output shaft during the operation of said engine.

13. A method for controlling a combustion engine as claimed in claim 11, wherein said second control means includes means for recirculating exhaust gases caused by the combustion of air-fuel mixture into said engine and the step of generating a binary number electrical signal indicative of a condition of said engine further includes the step of generating a binary number electrical signal indicating changes of in the coolant temperature of said engine.

14. A method for controlling a combustion engine as claimed in claim 11, wherein the step of calculating first and second values corresponding to respective settings of said first and second control means further includes the step of calculating a third value to sequentially compensate said first and second calculated values, said computer being further programmed to calculate said third value from a third function describing a desired relationship between the condition of said engine and said first and second calculated values.

15. In an electrical control apparatus for a combustion engine having an output shaft driven by mechanical energy converted from heat energy caused by the combustion of an air-fuel mixture, said engine including first control means for controlling either the amount of air-fuel mixture metered into said engine and/or the spark-ignition timing of said engine and second control means for controlling the amount of exhaust gases recirculated from an exhaust pipe into said engine, said control apparatus including:

a first electrical circuit for generating an electrical signal in the form of a binary number, the signal indicating a condition of said engine as of a selected instant in time during the operation of said engine;

a digital computer for sequentially calculating first and second values corresponding to respective settings of said first and second control means by using said binary number electrical signal, said computer being programmed to calculate said first and second values from a first function describing a desired relationship between the condition of said engine and the setting of said first control means and from a second function describing another desired relationship between the condition of said engine and the setting of said second control means; and a second electrical circuit coupled between said digital computer and said first and second control means for converting said first and second calculated values into the settings of said first and second control means;

the improvement comprising:

a detector for generating output pulses at a frequency proportional to the rotational speed of said output shaft to initiate the calculation of said first value in said computer;

a clock circuit for generating clock pulses at a predetermined frequency to initiate the calculation of said second value in said computer, the frequency of said clock pulses being substantially lower than that of said output pulses from said detector during the idling of said engine; and an interrupt controller for issuing an interrupt request signal therefrom upon receiving one of said output pulses from said detector during the calculation of said second value to prohibit the calculation of said second value in said computer and to simultaneously initiate the calculation of said first value in said computer, the remainder of the prohibited calculation being executed in said computer after completion of the calculation of said first value, said interrupt controller issuing an interrupt prohibit signal therefrom during the calculation of said first value to continue the calculation of said first value in said computer.

16. The improvement as claimed in claim 15, wherein said interrupt controller comprises:

a first register for generating an output signal of a high level upon receiving one of said output pulses from said detector;

a second register for generating an output signal of a high level upon receiving one of said clock pulses;

an interruption mask for generating at its first and second terminals output signals of a low level during the calculation of said first value in said computer and generating at its first terminal an output signal of a high level and at its second terminal an output signal of a low level during the calculation of said second value in said computer; and a logic circuit for issuing an interrupt request signal upon receiving an output signal of a high level from said first register and an output signal of a high level from the first terminal of said mask during the calculation of said second value to prohibit the calculation of said second value and simultaneously initiate the calculation of said first value, said logic circuit issuing an interrupt prohibit signal upon receiving output signals of a low level from the first and second terminals of said interruption mask to continue the calculation of said first value.

17. The improvement as claimed in claim 15, wherein said clock circuit comprises a frequency divider for converting a timing pulse issued from said computer into at least one clock pulse with a predetermined frequency, the frequency of said clock pulses being substantially lower than that of said output pulses from said detector.

18. The improvement as claimed in claim 15, wherein said computer includes means for repetitively calculating a third value to sequentially compensate said first and second calculated values by using said binary number electrical signal, said computer being further programmed to calculate said third value from a third function describing a desired relationship between the condition of said engine and said first and second calculated values, and wherein said clock circuit further generates second clock pulses at a predetermined frequency to initiate the calculation of said third value in said computer, the frequency of said second clock pulses being lower than that of the first-named clock pulses;

said interrupt controller further providing an interrupt request signal upon receiving one of said output signals from said detector during the calculation of said third value to prohibit the calculation of said third value in said computer, the remainder of the prohibited calculation being executed in said computer after completion of the calculations of said first and second values.

19. The improvement as claimed in claim 18, wherein said clock circuit comprises a frequency divider for converting a timing pulse issued from said computer into at least first and second clock pulses to execute the respective calculations of said second and third values in said computer, the frequency of said first clock pulses being higher than that of said second clock pulses.

20. A method for controlling a combustion engine having an output shaft driven by mechanical energy converted from heat energy caused by the combustion of an air-fuel mixture, said engine including first control means for controlling the amount of air-fuel mixture metered into said engine and/or the spark-ignition timing of said engine and second control means for controlling the amount of exhaust gases recirculated from an exhaust pipe into said engine, said method comprising the steps of:

a. generating an electrical signal in the form of a binary number, said signal indicating a condition of said engine as of a selected instant in time during operation of said engine;
b. generating output pulses at a frequency proportional to the rotational speed of said output shaft to initiate the calculation of a first value;
c. generating clock pulses at a predetermined frequency, the frequency of said clock pulses being lower than that of said output pulses;
d. sequentially calculating first and second values corresponding to respective settings of said first and second control means by a computer programmed to calculate said first and second values from a first function describing a desired relationship between the condition of said engine and the setting of said first control means and from a second function describing another desired relationship between the condition of said engine and the setting of said second control means, each calculation of the first and second values being executed by using said binary number electrical signal in response to said output pulses and said clock pulses, respectively;
e. issuing an interrupt request signal in response to one of said output pulses during the calculation of said second value in said computer to prohibit the calculation of said second value in said computer and simultaneously initiate the calculation of said first value in said computer, the remainder of the prohibited calculation being executed in said computer after completion of the calculation of said first value;
f. issuing an interrupt prohibit signal during the calculation of said first value to continue the calculation of said first value in said computer;
g. converting said first and second calculated values into the settings of said first and second control means; and
h. continuously repeating the above sequence of steps for controlling the combustion of the air-fuel mixture in response to any changes in said binary number electrical signal.

* * * * *